Patented Jan. 26, 1943

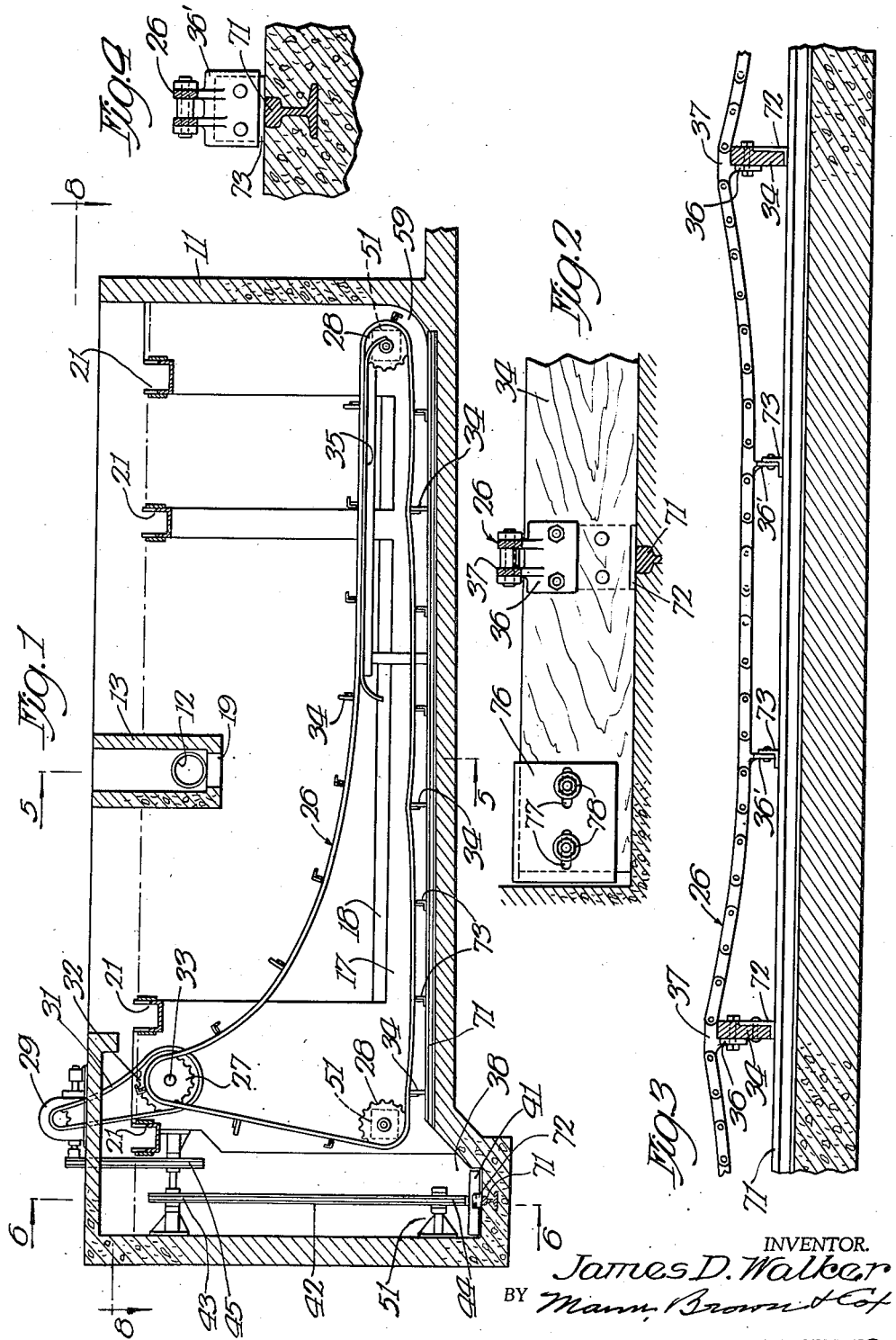

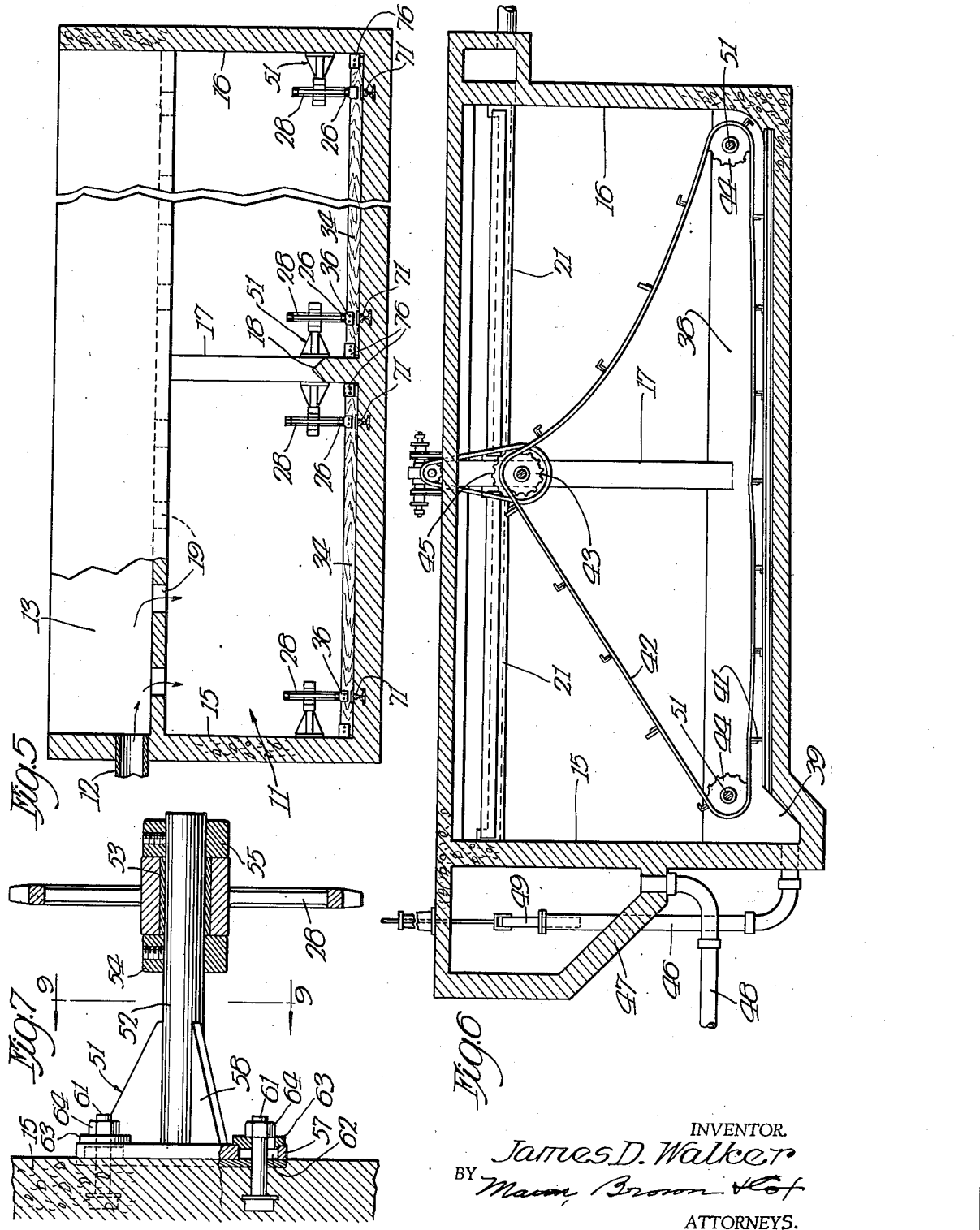

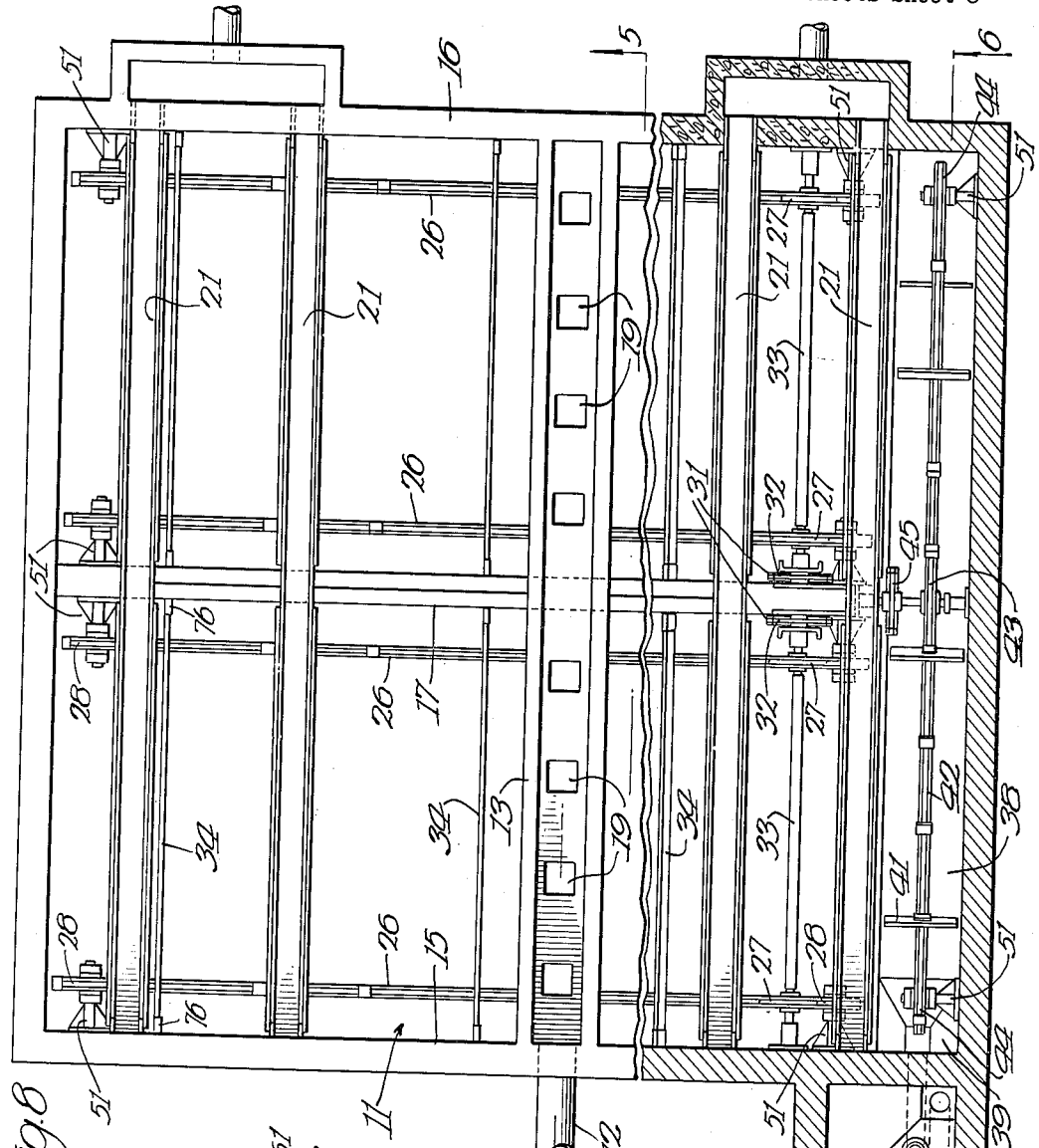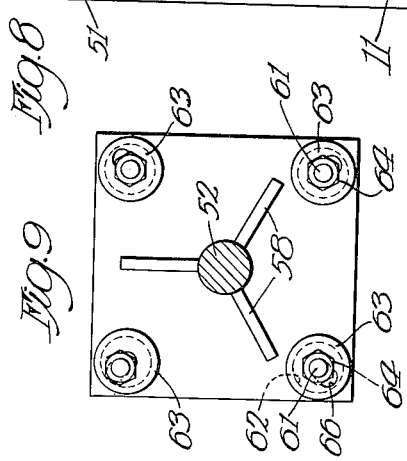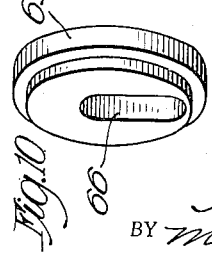

2,309,556

UNITED STATES PATENT OFFICE 2,309,556

SEDIMENT COLLECTING MECHANISM

James D. Walker, Aurora, Ill., assignor to The American Well Works, Aurora, Ill., a corporation of Illinois Application December 22, 1939, Serial No. 310,562

10 Claims. (Cl. 210—55)

In settling tanks for sewage the sediment or sludge settles all along the length of the tank, and is scraped along the bottom of the tank to a position near the sludge outlet. In the case of flat-bottomed rectangular tanks the sludge scraping means generally comprises two endless chains carrying between them a plurality of scraping blades, called flights, which drag on the floor as the chains are driven around suitable sprockets. In order for the bottom reach of this scraping conveyor to run along the entire length of the tank it is necessary for sprockets to be positioned near the two ends of the tank approximately at the bottom thereof.

In modern continuous treatment plants it is desirable to be able to operate a settling tank for long periods of time without interruption. There have been various causes of interruptions heretofore and one object of the invention is to eliminate or reduce these causes of interruption insofar as they pertain to the sludge scraping mechanism. Another object is to simplify the cost of building, assembling and maintaining this scraping mechanism.

One cause of trouble heretofore has been due to the fact that the sprockets at each end of the tank at the bottom thereof have conventionally been mounted on a shaft extending across the tank. These shafts have presented various difficulties. One of the worst is that the natural catenary or sagging of the shaft at its center causes a certain amount of torsion to exist in the bearings at the ends of the shaft, which causes the bearings to wear out quickly and may cause a bind since lubrication is difficult. When bearing trouble is encountered or when inspection is desired, the entire shaft must be removed from its bearings and reassembled, and this is a relatively expensive or time-consuming task. Likewise, the original installation of the shafts and sprockets is time-consuming.

According to the present invention all of these difficulties due to the use of the shaft are eliminated by using a cantilever construction of sprocket suspension instead of using a shaft extending across the tank. In short, each sprocket is mounted on a stub shaft which is carried by a bracket adjacent to the sprocket on the wall of the tank. The sprocket is journaled on the shaft and there is no torsion between the sprocket and the shaft. The sprocket may easily be removed for inspection. Assembly, both initial and after inspection, is extremely simple. Furthermore, the cost of materials is reduced since the entire center portion of the shaft is omitted.

Another cause for occasional interruption is wearing of the chains. Not only is this a cause for interruption but of course it is an expense since the chains must be replaced when they have become badly worn. The chief wear of the chains comes from their dragging on the concrete floor of the tank where the chains sag between the wooden flights or scrapers. It has previously been discovered that the life of the collector blades could be greatly prolonged by sinking wear rails in the floor of the concrete tank and providing metal wear shoes on the wooden flights which drag on the floor, but this did not prolong the life of the chains. According to the present invention the wear rails are positioned directly below the sprockets and hence below the chain, and the chain is provided with occasional wear shoes similar to those on the wooden blades or flights so that the chain itself no longer drags on the floor. In this manner chain wear has been practically eliminated and the life of the chain greatly increased. In the past the chains have been worn by this dragging to a point where the pins fell out long before the chains commenced to show any other wear.

Considerable difficulty has also been encountered heretofore due to expansion of the wooden flights as they soaked up the water in the tank. It is of course desirable to have the flights fit closely to the side walls of the tank so as to perform their scraping job as thoroughly as possible. However, expansion has occasionally caused the flights to bind between the tank walls and either split or break the mechanism. The remedy heretofore has been to saw off the end of the flight, but usually much more was sawed off than necessary, leaving a poor fit. According to the present invention a bronze plate or other suitable extension is attached to the ends of the flights by bolts extending through longitudinal slots, the length of the slots and the projection of the plates beyond the wooden flights being sufficient to provide ample accommodation for expansion. As the flights expand, the walls merely shove the plates in farther toward the center of the flights, so that the combined length of the wooden flight plus the expansion plates always has the optimum fit with walls of the tank.

Additional objects and advantages of the invention will be apparent from the following description and from the drawings, in which:

Fig. 1 is a vertical sectional view, taken longitudinally of a main scraping mechanism, of a settling tank chosen for illustration of this invention.

Figs. 2, 3 and 4 are details of the sediment scraping mechanism therein.

Fig. 5 is a transverse sectional view taken approximately on the line 5—5 of Fig. 1.

Fig. 6 is a vertical sectional view taken approximately on the line 6—6 of Figs. 1 and 8.

Fig. 7 is an enlarged detailed sectional view taken through one of the sprockets.

Fig. 8 is a plan view of the settling tank illustrated in Figs. 1 to 7, partly broken away to show a section on line 8—8 of Fig. 1.

Fig. 9 is a detail view of the bracket, being taken approximately on the line 9—9 of Fig. 7.

Fig. 10 is a perspective view of one of the washers shown in Figs. 7 and 9.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

The plan view of the tank 11 is seen in Fig. 8. Sewage, either raw or after treatment, is supplied to the tank 11 through a pipe 12 which supplies the sewage to a trough or launder 13 extending across the entire settling tank from side wall 15 to side wall 16. It may be noted that this is really a double settling tank and that the center wall 17 can be considered the side wall of a tank comprising one-half of the double tank shown. By building the tank as illustrated, however, there are certain economies. For example, the center wall 17 need not be built the full height throughout its length but may be of reduced height throughout most of its length as seen in Fig. 1, the portion of reduced height being peaked, as seen at 18 in Fig. 5, to cause sludge which settles thereon to slide off to the bottom of the tank. Also, the total length of outside wall is greatly decreased.

Trough 13 is provided with a plurality of openings 19 through which the sewage flows into the tank 11. Although the pipe 12 has been shown entering the end of the trough 13, it could enter the center thereof if preferred. Because the liquid level in the tank is well above the openings 19, the flow through these openings will be approximately equal. However, if inequality is encountered at any time, the volume of flow through the openings 19 may be made approximately uniform throughout the length of the trough 13 by proper design or adjustment of the size of openings 19; adjustable gates may be provided for this purpose.

From the trough 13 the sewage flows very gently in both directions through the tank—so gently in fact that the sewage is practically quiescent and the solid particles have adequate time to settle therefrom. As the solid particles settle, the clear or relatively clear liquid rises to the top and is drawn off over weirs 21.

It has been the practice heretofore to provide a long and relatively narrow tank, perhaps twice the length and half the width of that illustrated, and to supply the sewage to one end thereof and withdraw the effluent from the other end. The present design increases the hydraulic efficiency and settling efficiency. Since the tank is only half as long and the liquid is introduced at the center of the tank, the stream flowing in each direction only has one-fourth the distance to flow. It has the same length of time for flowing this shorter distance as for flowing from end to end in the longer conventional tank. The result is that the liquid is much more nearly quiescent and better settling results can be expected. In handling large volumes this tank is much more economical and efficient than settling tanks have been heretofore. If it is made 60 feet long, one side of the tank is at least the equivalent of two 40-foot tanks heretofore, which would have required two collector mechanisms instead of the one used in one-half of this tank. One of the reasons for the greater efficiency is that the weirs are so disposed as to draw off effluent from a very large area or even from substantially the entire surface.

The general nature of the longitudinal scraping mechanism is seen best in Figs. 1 and 8. In each tank and in each tank-half a pair of endless chains 26 are carried around sprockets 27 and 28. The sprockets 27 are driven as by means of a motor and speed reduction unit 29, chain 31, sprocket 32, and shafts 33. The chain 26 carries a plurality of scraper blades or flights 34 which, as seen best in Fig. 3, may be secured to brackets 36 formed on or carried by chain links 37 of the chains 26. The chains 26 are driven in the direction of the arrows in Fig. 1 so that the scraper blades 34 are drawn along the floor of the tank and scrape the sediment into a hopper 38 at one end of the tank. Supporting runners 35 may be provided under the upper reach of each chain if desired.

In the hopper 38 the sediment is scraped toward a hopper 39 depressed at one end of the hopper 38 by means of scraper blades 41 carried by a chain 42 extending around sprockets 43 and 44, the sprocket 43 being driven as by a sprocket 45. From the hopper 39 the sediment flows through a pipe 46, the outlet of which is below the level of liquid in tank 11, into a basin 47, from which it is drawn off through pipe 48. The rate of flow of the sediment may be controlled by raising or lowering the sliding pipe 49 which telescopes within pipe 46, the height of the open end of the pipe 49 below the level of the liquid in the settling tank 11 determining the rate of flow of the sediment.

Heretofore each pair of sprockets 28 has been carried by a shaft extending across the tank. Such shafts have naturally sagged at the middle, and this sag has produced a torsion in the end bearings for the shaft with the result that the friction and wear on these bearings were inevitably increased and in some instances binding would take place. Furthermore, the assembly and removal of the shaft was a relatively time-consuming task. According to the present invention all of these difficulties due to the use of a shaft extending across the tank for the sprockets 28 have been eliminated by mounting each of the sprockets 28 (and also the sprockets 44) in the manner shown in Fig. 7. As clearly seen in this figure, a bracket 51 of the cantilever type is secured to the side walls of the tank such as the walls 15, 16 or 17. The bracket 51 includes a stub shaft 52 extending therefrom on which the sprocket 28 is journaled. The sprocket 28 may be provided with a bearing sleeve 53 and may be secured in place on the shaft 52 by collars 54 and 55 which in turn may be secured by setscrews.

The bracket 51 includes a base plate 57 and reinforcing webs 58 which adequately support such load as the stub shaft 52 must carry.

In order to remove the sprocket 28 from the stub shaft 52 for inspection or repair, it is merely necessary to remove the collar 55 and slide the sprocket 28 along the shaft 52. Assembly is equally simple. Furthermore, replacement will rarely be necessary because abnormal friction due to sagging of an elongated shaft at its center has been eliminated.

It should also be noted that aside from the sagging it is somewhat difficult in this type of structure, in which the opposite concrete walls of the tank are likely not to be exactly uniform, to get bearings for a shaft in perfect alignment, remembering that no only must the proper spots on the wall be chosen but also the bearings must be mounted in such angular position that each is axially aligned with the intended spot on the opposite wall. According to the present invention, extreme accuracy of angular alignment of the shaft 52 is not necessary because the sprocket 28 will assume whatever angle is assumed by the stub shaft 52.

Although accurate positioning of the shaft 52 is not essential, it is desirable to so position the shaft 52 that the sprockets 28 seen at the right in Fig. 1 will be the correct distance from the curved corner portion 59 of the tank 11. The correct distance is such that the scraping blades 34 will scrape or approximately scrape along this surface but without binding thereon. The constructional details shown in Figs. 7, 9 and 10 permit this adjustment and also permit slight imperfections in the positioning of mounting bolts 61 in the concrete walls 15, 16 and 17. The base plate 57 is provided with a plurality of enlarged holes 62 through which the bolts 61 extend. These holes permit considerable variation in the positioning of the bolts or studs 61 and also permit considerable adjustment of the position of the base plate 57 and the bracket 51. Once the correct adjustment is determined, it is made permanent by placing slotted and flanged washers 63 in the enlarged holes 62 and over the studs 61, these washers being turned to such a position that they will fit over these studs. After nuts 64 are applied and tightened, the bracket 51 will be immovable. As seen in Fig. 10, the slot 66 in each of the washers 63 extends from a position to receive the stud 61 at the middle of the washer to a position to receive it almost at the periphery of the washer.

It has been common heretofore to imbed wear rails 71 in the floors of the tanks and to provide wear shoes 72 on the scraper blades as seen in Fig. 2. The top of the wear rail 71 is preferably very slightly above the top of the concrete floor, with the result that the wear shoe 72 will rest on it, and the scraper blade 34 will approximately engage the concrete floor of the tank but will not be continuously worn thereby. According to the present invention the wear rails 71 are positioned in alignment with the sprockets 28, as seen best in Fig. 5. The result is that if the chain drags between the two adjacent scraper blades 34, it will drag on the relatively smooth wear rail and hence will not wear nearly as fast as if it were dragged along the concrete as heretofore. However, it is preferred that the wear on the chain 26 be substantially eliminated by preventing it from dragging. This is accomplished according to the present invention by providing wear shoes 73 which are secured to brackets 36' which may be identical with brackets 36. These wear shoes 73 slide along the wear rails 71 and are spaced sufficiently close together so that the chain will not sag enough between the wear shoes 73 to drag on the wear rail 71. In this manner the length of life of the chains is very greatly increased.

It is desirable to scrape the tank as clean as possible. This is particularly true in the case of sludge inasmuch as sludge which is left for a long period may become putrid. Accordingly, it is desirable for the scraper blades 34 to fit quite closely to the side walls 15, 16 and 17 of the tanks. However, if they are initially cut to fit closely, they are likely to bind after they have been expanded by the absorption of water. If they bind, they will at the very least increase friction of the mechanism and are likely to split and become quite unsatisfactory or to bind sufficiently severely to break some part of the mechanism. When the scrapers begin to bind, the attendant is likely to saw off their ends so as to prevent the binding and, in doing so, he is likely to saw off much more than necessary with the result that the fit is no longer proper. According to the present invention all of these difficulties are avoided by providing expansion plates 76 at one or both ends of each scraper blade 34, these expansion plates being preferably in the form of bronze plates having slots 77 therein extending longitudinally of the blade 34. The plate 76 is initially secured to the blade 34 by bolts 78 which are tightened enough to hold the plate 76 firmly in place and yet permit it to slide under pressure. Initially the plate may project three or four inches beyond the end of the blade 34, and the bolts 78 will be at the inner end of the slots 77. As the blade 34 expands, the pressure of the side wall of the tank against the plate 76 will slide the plate 76 inwardly and thus prevent binding of the blade 34 on the side walls of the tank.

From the foregoing it is seen that scraping mechanism for a settling tank is provided which is relatively inexpensive and easy to install and which will be substantially free from wear and from other troubles which are likely to require a shut-down. The three major causes of trouble heretofore have all been eliminated, namely, dragging of the chain on the floor, binding of the scraper blades on the side walls due to expansion, and bearing difficulty of the lower sprockets due to sagging of the shaft at the center or improper alignment of the bearings with respect to the shaft.

I claim:

1. Sediment collecting apparatus for a settling tank, including aligned sprockets remotely spaced from one another along the bottom of the tank, a chain extending around the aligned sprocket, means for driving the chain, collecting blades carried by the chain adapted to drag along the floor of the tank for moving the sediment thereon, a wear rail aligned with the chain along the floor of the tank, and wear shoes carried by and projecting downwardly from the chain at points between the collecting blades and sufficiently close together to prevent the chain from dragging on the wear rail.

2. Sediment collecting apparatus for a settling tank, including aligned sprockets remotely spaced from one another along the bottom of the tank, a chain extending around the aligned sprocket, means for driving the chain, collecting blades carried by the chain adapted to drag along the floor of the tank for moving the sediment thereon, and wear shoes carried by and projecting downwardly from the chain at points between the collecting blades and sufficiently close together to prevent the chain from dragging.

3. Sediment collecting apparatus for a settling tank, including endless conveyor means, a rigid wooden collecting blade carried by the conveyor means along the bottom of the tank, and an extension projecting from the end of said blade to scrape adjacent the side wall of the tank, said extension being shiftable by a simple sliding movement longitudinally with respect to the blade by reaction with the sidewalls as the blade expands to prevent the binding of the blade between the side walls of the tank.

4. Sediment collecting apparatus for a settling tank, including a rigid collecting blade extending approximately between opposite walls of the tank and including two portions which are longitudinally slidable by reaction with the walls to prevent binding of the blade between the walls, and means for moving the blade along the tank.

5. Sediment collecting mechanism for a settling tank, including a bracket secured to one wall of the tank, a stub shaft extending away from the bracket, a sprocket mounted on the shaft, a chain carried by the sprocket, means for driving the chain, and sediment moving means carried by the chain, said bracket being secured to the wall by means of threaded studs extending through oversize holes in the bracket, slotted and flanged washers projecting into said holes and through which the studs pass, and nuts screwed on said studs against said washers.

6. In sediment collecting mechanism for a settling tank, threaded studs secured to a wall of the tank and projecting therefrom, a bracket having oversize holes therethrough for receiving the studs and secured to one wall of the tank for supporting moving parts of the mechanism, said bracket being secured to the wall by means of the threaded studs extending through the oversize holes in the bracket, slotted and flanged washers projecting into said holes and through which the studs pass, and nuts screwed on said studs against said washers.

7. In sediment collecting mechanism for a settling tank, threaded studs secured to a wall of the tank and projecting therefrom, a bracket having oversized holes therethrough for receiving the studs and secured to one wall of the tank for supporting moving parts of the mechanism, said bracket being secured to the wall by means of the threaded studs extending through the oversize holes in the bracket, nuts screwed on said studs, and slotted washers through which the studs pass, clamped against the bracket by the nuts and extending into the bracket; the bracket closely surrounding the portion of the washers extending into the bracket whereby danger of slipping of the bracket is substantially eliminated.

8. Sediment collecting apparatus for settling tanks, including a pair of aligned brackets secured to opposite walls of the tank, horizontal stub shafts extending away from the brackets in alignment, a sprocket mounted on each stub shaft, two chains, with one extending around each sprocket, means for driving the chains, and sediment moving means disposed to move along the botttom of the tank, extending between and a substantial distance beyond the two chains and secured thereto; at least one of said sprockets being spaced a substantial distance from the wall and said bracket including reinforcing flanges elongated in a direction extending outwardly from the wall for bracing the stub shaft, and means securing the bracket to the wall with sufficient strength to resist the torque produced by the weight of the chains and associated parts carried at a point substantially spaced from the wall.

9. Sediment collecting apparatus for settling tanks, including a pair of aligned brackets secured to opposite walls of the tank, horizontal stub shafts extending away from the brackets in alignment, a sprocket mounted on each stub shaft, two chains, with one extending around each sprocket, means for driving the chains, and sediment moving means disposed to move along the bottom of the tank, extending between and a substantial distance beyond the two chains and secured thereto; at least one of said sprockets being spaced a substantial distance from the wall and said bracket including reinforcing flanges elongated in a direction extending outwardly from the wall for bracing the stub shaft, said flanges being substantially free from horizontal sediment-collecting surfaces and at least one of said flanges sloping laterally and downwardly from the shaft, and means securing the bracket to the wall with sufficient strength to resist the torque produced by the weight of the chains and associated parts carried at a point substantially spaced from the wall.

10. Sediment-collecting apparatus for settling tanks, including a bracket secured to a side wall of the tank, a horizontal stub shaft extending away from the bracket, a sprocket mounted on the shaft, a chain extending around the sprocket, additional sprockets maintaining the chain in a loop, means for driving the chain, and sediment moving means disposed to move along the bottom of the tank, extending a substantial distance beyond the chain on each side thereof and secured thereto; the sprocket being spaced a substantial distance from the wall and the bracket including reinforcing flanges elongated in a direction extending outwardly from the wall for bracing the stub shaft, said flanges being substantially free from horizontal sediment-collecting surfaces and at least one of said flanges sloping laterally and downwardly from the shaft, and means securing the bracket to the wall with sufficient strength to resist the torque produced by the weight of the chain and associated parts carried at a point substantially spaced from the wall.

JAMES D. WALKER.